UNITED STATES PATENT OFFICE.

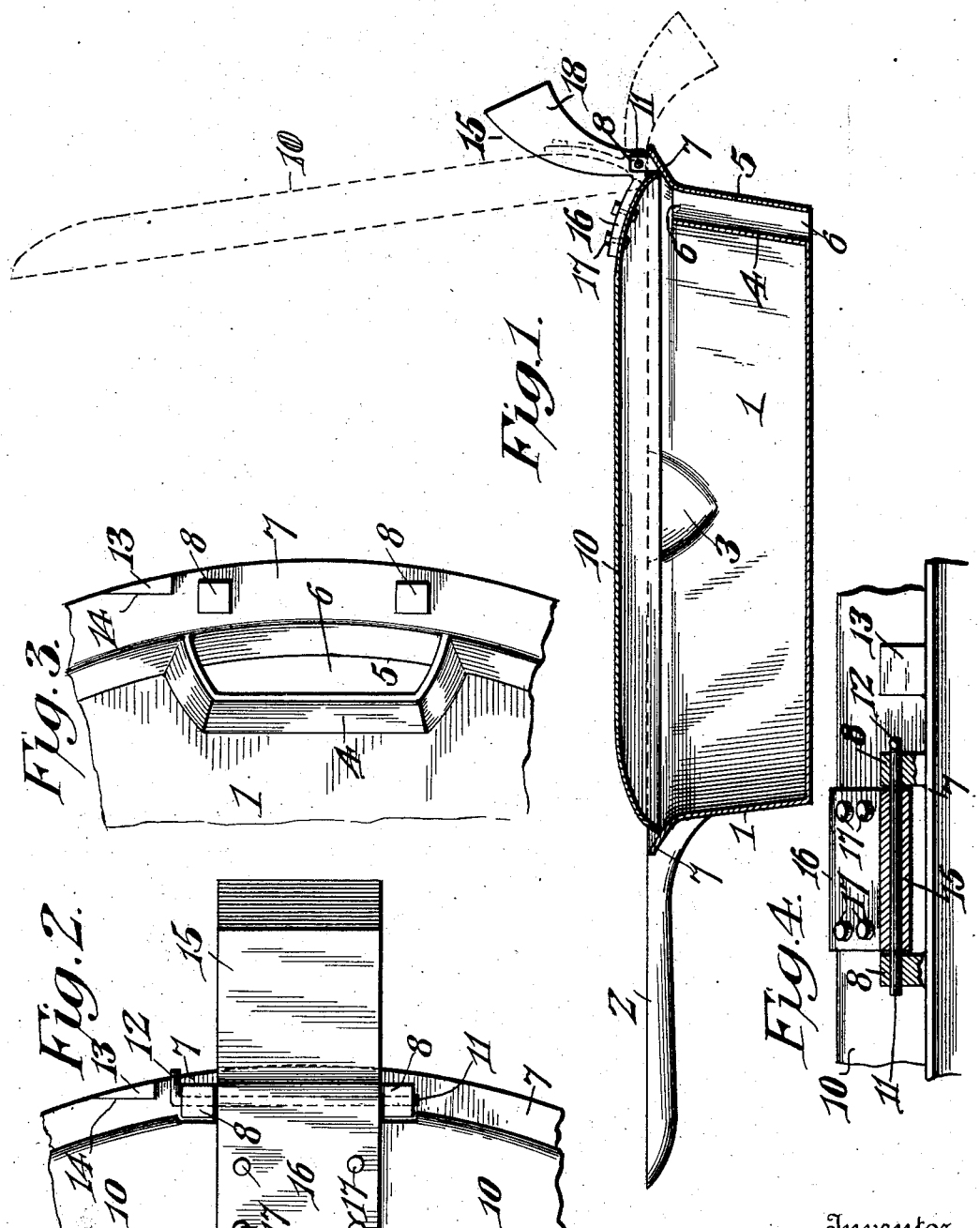

WALTER JAMES REYNOLDS, OF PROVIDENCE, RHODE ISLAND.

FRYING-PAN.

997,414. Specification of Letters Patent. Patented July 11, 1911.

Application filed March 3, 1910. Serial No. 547,163.

*To all whom it may concern:*

Be it known that I, WALTER J. REYNOLDS, a citizen of the United States, residing at Providence, in the county of Providence and State of Rhode Island, have invented a new and useful Frying-Pan, of which the following is a specification.

This invention relates to improvements in cooking utensils, and the object of the invention is to provide a frying pan of such construction that grease and juices which tend to escape therefrom during the use of the pan, will be prevented from flying over the stove and will be retained within the pan.

A further object of the invention is to improve and simplify the construction of frying pans, and the invention consists in certain novel features which will be hereinafter described and claimed.

In the accompanying drawings, which fully illustrate my invention, Figure 1 is a vertical diametrical section of a frying pan showing the lid lowered in full lines and raised in dotted lines. Fig. 2 is an enlarged detail plan view of the hinged connection between the lid or cover and the body of the pan. Fig. 3 is an enlarged detail plan view of the hinge portion of the pan. Fig. 4 is a detail section taken longitudinally through the hinge.

The body 1 of the pan is constructed by casting or otherwise, and is provided with a handle 2 and a spout or pouring lip 3 of the usual form. At a point preferably diametrically opposite the handle, the body is formed with an offset portion 4 projecting inwardly from the outer wall 5 and forming therewith an odor tube or flue having open upper and lower ends, as indicated at 6, through which steam smoke and odors rising from the food being cooked may pass into the stove and so escape through the chimney. The annular wall of the body of the pan is constructed at its upper edge or extremity with an outwardly-flared or beveled portion 7 which will cause any grease or other juices rising from the food to be deflected and returned to the pan. Upon the beveled or flared portion 7 of the body, at a point preferably immediately adjacent the odor tube, I provide perforated lugs or ears 8 through which and an outwardly-projecting arm on the cover 10, a pivot pin 11 is inserted in order to hinge the cover to the body, so that the cover may freely swing upward and downward. In order to prevent accidental detachment of the pivot 11, one end of the pivot pin is bent to form a handle or stop 12 which may rest in the space between one of the lugs 8 and a stop lug 13 formed on the body of the pan adjacent the said lug 8 and having its inner face 14 located out of alinement with the openings in the lugs 8. The perforations in the lugs 8 and the arm projecting from the cover having been brought into alinement, the pivot pin 11 is inserted through the same with the stop or handle 12 in an upstanding position. When the said stop has cleared the stop lug 13, the pin is turned so that the stop or handle 12 will project toward the outer side of the pan and lie between the lug 8 and the stop lug 13, as clearly shown in Fig. 2. The cover or lid 10 will thus be detachably hinged to the body of the pan so that it may swing freely and at the same time may be readily separated therefrom when it is desired to clean the utensil. The arm projecting from the cover is shown at 15. This arm extends between the lugs 8 and is enlarged at its outer free end so that it constitutes a counterweight handle to facilitate the opening and closing of the cover. This counterweight handle has an inner flat plate-like portion 16 secured to the cover by rivets 17, and an outer curved arm 18 extending from the said plate-like portion 16 at an acute angle thereto, so that when the lid is in its closed position, this arm 18 will project upward substantially over the pivot pin 11 which is inserted through a transverse perforation or opening at the angle formed by the junction of the two arms. When it is desired to raise the lid, a slight force is exerted upon the outstanding arm 18 so that the said arm will move downward into the position shown in dotted lines in Fig. 1, whereupon the lid will immediately swing upward into the open position indicated by dotted lines in said figure. In this position of the parts, the weighted handle will rest against the flared edge of the body of the pan and this engagement of the weighted handle and the edge of the body will prevent the lid swinging outward beyond the body, so that any steam or grease condensing upon the lid will be forced to move downward thereon and return to the pan and will be thereby prevented from dropping on to the stove. This weighted arm, furthermore, serves to facilitate the opening or closing of the lid, inasmuch as its weight will accelerate the movement of the lid in either direction after it has been carried beyond the point of balance.

It will be observed, upon reference to Fig. 1, that in its closed position, the edge of the lid rests upon the flared portion of the body of the pan below the extreme edge of the same, and consequently, no part of the savory and nourishing juices will be permitted to escape from the pan and be lost.

My device is extremely simple in its construction and its advantages are thought to be obvious and to need no further detail mention.

When a cheap and light pan is desired, the body may be stamped out of sheet metal and the lugs 8 and 13 formed by posts or studs riveted or otherwise secured to the body. The device may, of course, be formed in any desired size and of any suitable material.

Having thus described the invention, what I claim as new, and desire to secure by Letters Patent, is:—

1. The combination with the body of a frying pan having an outwardly flared portion around its upper edge, of a lid, an arm secured to the outer face of the lid, means for hinging the arm to the flared portion of the body, said hinging means being located short of the flared outer edge of the body so as to dispose the hinge of the lid inwardly from said edge, said arm being provided with an upwardly and outwardly curved handle which projects beyond the vertical plane of the pan body when the lid is closed, said handle contacting at its inner side with the flared outer edge of the pan body when the lid is thrown open and preventing the lid from swinging outwardly beyond the vertical plane of the body.

2. The combination with the body of a frying pan provided with a pair of upstanding perforated ears near its edge and with a stop lug adjacent one of said ears and out of alinement with the perforations therein, a lid having an outstanding arm on its edge extending between the ears on the body, and a pivot pin inserted through the perforations of the said ears and the arm and provided with a stop adapted to engage between one of said ears and the stop lug.

3. The improved frying pan herein described and shown comprising a body having an outwardly-flared portion at its upper edge, upstanding ears on the said flared portion, a stop lug on said flared portion adjacent one of said ears and out of alinement with the same, a lid provided with a counterbalancing arm projecting outward and upward therefrom at an angle thereto between the ears, and a pivot pin inserted through the said arm and ears and provided with a lateral stop adapted to engage between one of the ears and the stop lug.

In testimony, that I claim the foregoing as my own, I have hereto affixed my signature in the presence of two witnesses.

WALTER JAMES REYNOLDS.

Witnesses:
  ZEPHANIAH BROWN,
  CHARLES H. TITUS.

---

Copies of this patent may be obtained for five cents each, by addressing the "Commissioner of Patents, Washington, D. C."